US006808597B2

(12) United States Patent
Allen (10) Patent No.: US 6,808,597 B2
(45) Date of Patent: Oct. 26, 2004

(54) METHODS OF MAKING AND USING CREPING ADHESIVES COMPRISED OF POLYAMINE-EPIHALOHYDRIN RESIN/POLY(VINYL ALCOHOL) MIXTURES (75) Inventor: Anthony J. Allen, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 63 days.

(21) Appl. No.: 10/191,952

(22) Filed: Jul. 9, 2002

(65) Prior Publication Data

US 2002/0173580 A1 Nov. 21, 2002

Related U.S. Application Data (62) Division of application No. 09/444,725, filed on Nov. 24, 1999, now abandoned.

(51) Int. Cl.[7] .................................................. B31F 1/12
(52) U.S. Cl. ....................... 162/111; 156/183; 162/112; 162/164.3; 162/164.6; 264/282; 264/283; 524/503
(58) Field of Search ....................... 156/183; 162/164.3, 162/164.6, 111, 112; 524/503; 264/282, 283

(56) References Cited

U.S. PATENT DOCUMENTS 3,812,000 A * 5/1974 Shaw .......................... 162/111
3,821,068 A * 6/1974 Allen et al. .................. 162/111
5,833,806 A * 11/1998 Allen et al. .................. 162/111

* cited by examiner

Primary Examiner—Judy M. Reddick
(74) Attorney, Agent, or Firm—Gary Samuels (57) ABSTRACT Methods for making creping adhesives and using them in the creping of cellulosic fiber webs. The creping adhesives are a combination of polyamine-epihalohydrin and poly(vinyl alcohol). The method comprises the preparation and application of the creping adhesives to attain strong adhesion of fiber webs onto a drying surface, and the creping of the fiber webs to obtain a soft, bulky tissue paper web.

40 Claims, 3 Drawing Sheets

Adhesion Testing of Creping Formulations

| SAMPLE NOS. | ADHESIVE FORMULATION | ADHESION (kg) |
|---|---|---|
| 1 | 100% Crepetrol® 73 | 23.7 |
| 2 | 100% Airvol 540 | 9.5 |
| 3 | 100% Kymene® 557LX | 24.1 |
| 4 | 80% K-557LX/20% Airvol 540 | 33.3 |
| 5 | 60% K-557LX/40% Airvol 540 | 24.1 |
| 6 | 40% K-557LX/60% Airvol 540 | 16.6 |
| 7 | 20% K-557LX/80% Airvol 540 | 12.1 |
| 8 | 80% Crepetrol 73/20% Airvol 540 | 30.0 |
| 9 | 60% Crepetrol 73/40% Airvol 540 | 36.4 |
| 10 | 40% Crepetrol 73/60% Airvol 540 | 38.9 |
| 11 | 20% Crepetrol 73/80% Airvol 540 | 29.7 |
| 12 | 100% Airvol 425 | 5.9 |
| 13 | 75% K-557LX/25% Airvol 425 | 21.9 |
| 14 | 50% K-557LX/50% Airvol 425 | 11.7 |
| 15 | 25% K-557LX/75% Airvol 425 | 5.7 |
| 16 | 80% Crepetrol 73/20% Airvol 425 | 28.1 |
| 17 | 60% Crepetrol 73/40% Airvol 425 | 25.0 |
| 18 | 40% Crepetrol 73/60% Airvol 425 | 20.0 |
| 19 | 20% Crepetrol 73/80% Airvol 425 | 11.9 |
| 20 | 100% Airvol 523 | 12.3 |
| 21 | 80% Crepetrol 73/20% Airvol 523 | 36.3 |
| 22 | 60% Crepetrol 73/40% Airvol 523 | 36.1 |
| 23 | 40% Crepetrol 73/60% Airvol 523 | 26.9 |
| 24 | 20% Crepetrol 73/80% Airvol 523 | 17.1 |

FIGURE 3

METHODS OF MAKING AND USING CREPING ADHESIVES COMPRISED OF POLYAMINE-EPIHALOHYDRIN RESIN/ POLY(VINYL ALCOHOL) MIXTURES

This application is a division of application Ser. No. 09/444,725, filed Nov. 24, 1999, now abandoned.

BACKGROUND OF THE INVENTION

1. Field of the Invention

The present invention relates to methods of making creping adhesives and using such adhesives for creping tissue paper. The creping adhesives of the present invention include polyamine-epihalohydrin resin and poly(vinyl alcohol) mixtures, and are useful in the manufacture of soft, absorbent tissue paper webs.

2. Background of the Invention and Related Information

Creping adhesives are used in the process of producing tissue and towel paper products in order to improve the quality of the manufactured product and to improve the productivity of machines producing these grades of paper [J. R. Nelson, Chemical Processing Aids in Papermaking: A Practical Guide 161–165 (K. J. Hipolit ed., TAPPI Press, Atlanta, Ga. 1992)].

Polyamidoamine-epichlorohydrin resins have been used as creping adhesives in the following patents: U.S. Pat. No. 5,388,807 to Espy et al., U.S. Pat. No. 5,786,429 to Allen, U.S. Pat. No. 5,902,862 to Allen and Canadian Patent No. 979,579 to Giles et al.

Attempts have been made to use poly(vinyl alcohol) or PVOH as a component of creping adhesive formulations.

For example, U.S. Pat. No. 5,025,046 to Soerens discloses creping adhesives comprising water and suspended solids containing poly(vinyl alcohol), polyethylene oxide and lignin sulfonate. The adhesive compositions are used in making creped tissue products to adhere a paper web to a rotating cylinder from which it is then creped by a doctor blade.

Also, U.S. Pat. No. 5,179,150 to Furman, Jr. et al. discloses a creping adhesive comprising an amide polymer and PVOH. The polymer of Furman, Jr. et al. has amide and glyoxal substituents which are responsible for thermosetting properties. The creping adhesive disclosed is used in creping cellulosic webs. Combinations of PVOH with thermosetting, cationic polyamide resins have been used as creping adhesive compositions. Such combinations are disclosed in U.S. Pat. No. 4,501,640 to Soerens for a creping adhesive comprising (1) an aqueous mixture of PVOH; and (2) a water-soluble, thermosetting cationic polyamide resin which provide increased adhesion in the manufacture of creped wadding.

U.S. Pat. No. 4,528,316 to Soerens discloses an aqueous adhesive comprising water, PVOH and a water-soluble, cationic polyamide which is phase compatible with the PVOH. The polyamide of Soerens is the reaction product of a saturated aliphatic acid such as adipic acid, and a polyalkylene polyamine such as diethylene triarmine which is farther reacted with epichlorohydrin to yield the water-soluble, cationic polyamide. Furthermore, the adhesive of Soerens is used to adhere tissue to a creping cylinder in the manufacture of creped wadding.

U.S. Pat. No. 4,684,439 to Soerens also discloses a wettable creping adhesive comprising an aqueous admixture of PVOH and water-soluble, thermoplastic polyamide resin. The resin is the reaction product of a polyalkylene polyamine, a saturated aliphatic dibasic carboxylic acid, and a poly(oxyethylene)diamine.

U.S. Pat. No. 4,788,243 to Soerens discloses a creping adhesive comprising PVOH and a water-soluble, thermoplastic polyamide resin. The resin of Soerens is phase-compatible with PVOH and comprises the reaction product of polyalkylene polyamine, a saturated aliphatic dibasic carboxylic acid, and poly(oxyethylene)diamine. Additionally, U.S. Pat. No. 5,865,950 to Vinson et al. discloses a method for dry creping tissue paper comprising the application of creping adhesives comprising PVOH and a water-soluble, thermosetting, cationic polyamide resin in at least two steps.

Furthermore, U.S. Pat. No. 5,490,903 to Chen et al. discloses a creping adhesive composition comprising ethoxylated acetylenic diol. The creping adhesive composition of Chen et al. is said to be useful for creping through-dried tissue webs. Polyamine-epihalohydrin resins have been widely used in paper production [H. H. Espy, in "Wet Strength Resins and Their Application", L. L. Chan, Ed., pp. 21–22, TAPPI Press, Atlantic Ga. (1994)]. Polyamine-epihalohydrin resins differ from polyamidoamine-epichlorohydrin resins by the lack of amide linkages. This lack of amide linkages makes polyamine-epihalohydrin resins less susceptible to degradation by hydrolysis than polyamide-epihalohydrin resins. Another distinction is the degree of branching. The reaction of epichlorohydrin with a polyamine results in a highly branched structure having a variety of functional groups, such as secondary alcohol, secondary amine, tertiary amine, azetidinium chloride and aminochlorohydrin. The higher level of branching has a strong effect on the physical, mechanical and theological properties of the polyamine-epihalohydrin resins.

The polyamine-epihalohydrin resins are prepared in a one-step process in which a polyamine and an epihalohydrin are reacted in an aqueous medium until the desired molecular weight is achieved. The reaction is then diluted and/or stabilized at an acidic pH with an added acid.

In contrast, polyamidoamine-epihalohydrin resins are prepared in a two-step process, which involves the polycondensation of a dicarboxylic acid and a polyamine to form a polyamidoamine prepolymer. The polyamidoamine prepolymer contains amide linkages and secondary amine groups in the backbone. This prepolymer then reacts with epihalohydrin in an aqueous solution with heating to build molecular weight and provide reactive functionality to the polymer. Once the desired molecular weight or level of viscosity is achieved, the reaction is diluted and/or stabilized at an acidic pH with the addition of an acid.

Polyamine-epihalohydrin resins and their methods of preparation have been described in patents such as U.S. Pat. No. 3,248,353 to Coscia and U.S. Pat. No. 3,567,659 to Nagy. The former discloses the preparation of a cationic, water-soluble polyamine-epichlorohydrin resin polymer. The latter discloses the preparation of a methylamine-epichlorohydrin polymer and use of such polymer as a flocculant for suspended solids in sewage and mine effluent water, as well as dry strength agents for paper.

Other patents which disclose polyamine-epihalohydrin resins include U.S. Pat. No. 3,949,014 to Maki et al. in which the polyamine-epichlorohydrin resin is obtained by reacting epichlorohydrin with a polyamine resin having at least 2 amino groups per molecule, and an amphoteric high molecular weight compound. In addition, U.S. Pat. No. 4,129,528 to Petrovich et al. discloses resinous reaction products wherein the hydrohalide salt of a polyamine is condensed with an epihalohydrin to provide improved wet and dry strength to cellulosic substrates.

Further, compositions and methods of using polyamine-epihalohydrin resins as creping adhesive are disclosed in U.S. Pat. No. 5,660,687 to Allen et al. in which a composition comprising polyamine-epihalohydrin resin creping adhesive and a creping release agent are applied together or separately in the creping process. U.S. Pat. No. 5,833,806 to Allen et al. also discloses a method for creping fibrous webs comprising the application of a polyamine-epihalohydrin creping adhesive.

Despite many attempts to produce different kinds of creping adhesives, there still remains a need in the art for creping adhesives which provide improved adhesion. The present invention provides for methods of using strong creping adhesives which may be used in the creping process.

SUMMARY OF THE INVENTION

The present invention relates to methods of making creping adhesives and using such adhesives for creping tissue paper. The creping adhesives of the present invention include polyamine-epihalohydrin resin and PVOH, and are useful in the manufacture of soft, absorbent paper webs.

The present invention is directed to, methods of production of creping adhesives comprising polyamine-epihalohydrin resin and polyvinyl alcohol (PVOH) and use for creping paper webs.

In particular, the present invention is advantageous in providing strong adhesion of the cellulosic fiber web to the dryer surface during the creping process to attain a soft, bulky tissue paper web.

The present invention provides a method of making and using a creping adhesive composition comprising polyamine-epihalohydrin and polyvinyl alcohol, wherein the polyamine-epihalohydrin resin is the reaction product of an epihalohydrin and a polyamine, the polyamine has the following formula:

wherein A is [CHZ—(CH$_2$)$_n$—NR—]$_x$, or [CH$_2$—(CHZ)$_m$—(CH$_2$)$_n$—NR—]$_x$, when A is [CHZ—(CH$_2$)$_n$—NR—]$_x$, n=1 to 7; x=1 to 6; R=H or CH$_2$Y; Z=H or CH$_3$; and Y=CH$_2$Z, H, NH$_2$, or CH$_3$, when A is H$_2$N—[CH$_2$—CHZ)$_m$—(CH$_2$)$_n$—NR—]$_x$—H, m=1 to 6; n=1 to 6; m+n=2 to 7; R=H or CH$_2$Y, Z=H or CH$_3$; and Y=CH$_2$Z, H, NH$_2$, or CH$_3$. The polyamine-epihalohydrin resin is formed at a temperature less than or equal to 60° C., preferably at a temperature from about 25° C. to about 60° C., and most preferably at a temperature from about 30° C. to about 45° C.

Furthermore, the creping adhesive compositions used in the present invention may be present in the form of the reaction product of polyamine-epihalohydrin resin and polyvinyl alcohol.

The ratio by weight of polyamine-epihalohydrin resin: polyvinyl alcohol in the creping adhesive composition used in the present invention is in a range from about 99:1 to 1:99, preferably from about 95:5 to 5:95, and more preferably from about 90:10 to 10:90.

Further, the polyamine-epihalohydrin resin present in the creped paper web is from about 0.0001% to about 5%, preferably from about 0.0005% to about 1%, and most preferably from about 0.001% to about 0.5% by weight based on paper.

The polyvinyl alcohol present in the creped paper web is from about 0.0001% to about 5%, preferably 0.0005% to about 1%, and most preferably 0.001% to about 0.5% by weight based on paper.

Further, the molecular weight of the polyamine-epihalohydrin resin added to the creping adhesive used in the present invention is in a range from about 500 to about 1,000,000, preferably from about 2,500 to about 500,000, and most preferably from about 5,000 to about 250,000 Daltons before addition to form the adhesive.

The molecular weight of the polyvinyl alcohol added to the creping adhesive used in the present invention is in a range from about 10,000 to about 1,000,000, preferably from about 20,000 to about 500,000, and most preferably from about 50,000 to about 250,000 Daltons before addition to form the adhesive.

The degree of hydrolysis of the polyvinyl alcohol in the creping adhesive used in the present invention is from about 80% to about 90%, preferably from about 85% to about 99%, and most preferably from about 87% to about 98%.

Still further, the concentration of solids in the aqueous solution of the present invention is from about 0.01% to about 10% by weight of total polymer solids, preferably from about 0.2% to about 5%, and most preferably from about 0.1% to about 2.5% by weight of total polymer solids.

The fraction of polyamine-epihalohydrin resin present in the solids is from about 5% to about 95%, preferably from about 7.5% to about 92.5%, and most preferably from about 10% to about 90% by weight.

The fraction of polyvinyl alcohol present in the solids is from about 95% to about 5%, preferably from about 92.5% to about 7.5%, and most preferably from about 90% to about 10% by weight.

Still even further, the polyamines of the present invention include polyalkylene, polyaralkylene, polyalkarylene, or polyarylene amines. The polyaralkylene amines comprises 1-phenyl-2,4-pentane diamine, or 2-phenyl-1,3-propanediamnine. The polyarylene amines comprises phenylene diamine. The polyalkylene amines comprises ethylenediamine (EDA), bishexamethylenediamine (BHMT), hexamethylenediamine (HMDA), diethylenetriamine (DETA), triethyleneteramine (TETA), tetraethylenepentamine (TEPA), dipropylenetriamine (DNTA), tripropyleneteramine (TPTA), tetrapropylenepentamine (TPPA), N-methyl-bis-(aminopropyl)amine (MBAPA), spermine or spermidine.

Even further, the present invention comprises epihalohydrin such as epichlorohydrin, epibromohydrin or epiiodohydrin.

In addition, the creping composition used in the present invention may be in a form comprising at least one of aqueous, solid, dispersion, and aerosol.

Also, the method of the present invention comprises the simultaneous or individual application of a polyamine-epihalohydrin resin and a polyvinyl alcohol to a drying surface or paper web.

The present invention provides a method of creping cellulosic fiber webs which comprises the step of applying a creping adhesive to a drying surface, the creping adhesive comprising polyamine-epihalohydrin resin and polyvinyl alcohol.

According to the invention, the cellulosic fiber web may be adhered to the drying surface of a Yankee Dryer. The dry cellulosic fiber web is then creped from the drying surface with a creping instrument such as a doctor blade.

Furthermore, the present invention provides a method for creping cellulosic fiber webs which comprises applying a creping adhesive comprising the reaction product of the polyamine-epihalohydrin resin and polyvinyl alcohol.

In another aspect, the present invention provides a method of preparing a creping adhesive composition which comprises the step of combining a polyamine-epihalohydrin resin and a polyvinyl alcohol.

Furthermore, the present invention provides a method of preparing a creping adhesive composition comprising the reaction product of the polyamine-epihalohydrin resin and polyvinyl alcohol.

In still another aspect, the present invention provides a cellulosic fiber product which comprises polyamine-epihalohydrin resin and polyvinyl alcohol, and/or the reaction product thereof The cellulosic fiber product may comprise other additives including chemical functional agents such as wet strength or dry strength binders, retention aids, surfactants, sizing agents, chemical softeners, fillers, flocculants and other crepe-facilitating components.

BRIEF DESCRIPTION OF DRAWINGS

The foregoing and other objects, features and advantages of the invention will be apparent from the following more particular description of the preferred embodiments, as illustrated in the accompanying drawings, and wherein.

DETAILED DESCRIPTION OF THE INVENTION

The present invention is directed to a method of using creping adhesives possessing strong adhesion properties. The creping adhesive compositions used in the present invention are obtained from a combination of polyamine-epihalohydrin resin and poly(vinyl alcohol) or PVOH. Creping adhesives having such combinations can improve the performance of the creping process in the production of paper webs, particularly when used in the through-air-dried process. Further, the creping adhesive compositions used in the present invention can enhance the binding of cellulosic fiber webs onto the drying surface and provide softer paper webs.

The creping adhesives used in the present invention provide strong adhesion to cellulosic fiber webs and are advantageous over adhesion compositions in the art using polyamidoamine-epihalohydrin resins. The lack of amide linkages in the polymer backbone makes the polyamine-epihalohydrin resins less susceptible to degradation by hydrolysis in comparison to polyamidoamine-epihalohydrin resins. Also, the higher level of branching observed in polyamine-epihalohydrin in comparison to the polyamidoamine-epihalohydrin resins, has a strong effect on the polymer's physical, mechanical and theological properties.

As used herein, the term "web" refers to paper products including tissue paper or paper towels.

As used herein, the terms "cellulosic fiber web, fibrous web, tissue paper web, paper web, web and cellulosic fiber product" all refer to sheets of paper made by a process which comprises forming a papermaking furnish, depositing the furnish onto a foraminous surface, removing water from the web, and the steps of adhering the sheet to a drying surface such as a Yankee Dryer and removing the sheet by a creping blade such as a doctor blade.

The creping process of the present invention can include the steps of applying the presently claimed creping adhesive to a drying surface to provide a fibrous web, adhering the web to the drying surface by pressing the fibrous web against said surface, and creping the fibrous web with a creping device to dislodge it from the drying surface. The creping adhesive used in the present invention can also be applied to the fibrous web in the creping process.

The present invention also pertains to a process of creping paper. The creping process of the present invention can comprise the steps of providing a fibrous web, and creping this web. The creping process can be accomplished by applying a creping adhesive comprising polyamine-epihalohydrin resin and PVOH to the web, and/or applying the creping adhesive to a means for creping the web.

Fibrous webs, particularly paper webs, which are conventionally subjected to the creping process impart desired textural characteristics, such as softness and bulk. The creping process typically involves applying creping adhesives, in the forms comprising aqueous, solid, dispersion or aerosol to a drying surface or web. Preferably, the creping adhesive is in the form of an aqueous solution or dispersion. Preferably, the surface is the surface of a rotating creping cylinder, such as a Yankee dryer. The web is adhered to the indicated surface from which it is subsequently dislodged with a creping device, preferably a doctor blade. The impact of the web against the creping device ruptures some of the fiber-to-fiber bonds within the web, causing the web to wrinkle or pucker.

Creping adhesives used in the present invention can be used as according to any method known in the art. Such methods can include the procedures described in U.S. Patent No. 5,786,429 and U.S. Pat. No. 5,902,862, and Canadian Patent No. 979,579, which are incorporated herein by reference.

The creping adhesive compositions can also be used in conjunction with release agents and other modifiers for the Yankee dryer coating. Such release agents can include the well known oil-based release agents or the plasticizer-based release agents described in U.S. Pat. No. 5,660,687 and U.S. Pat. No. 5,833,806, which are incorporated herein by reference. Modifiers can include the tackifier resins of U.S. patent application Ser. No. 08/891,199, or the stabilizers described in U.S. patent application Ser. No. 09/135,428, which are incorporated herein by reference. In addition, the creping adhesive composition can contain surfactants, salts to adjust the water hardness, and/or acids or bases to adjust the pH of the creping adhesive composition or other useful additives.

Creped tissue paper webs comprise papermaking fibers. Small amounts of other paper additives can be present in the creped tissue paper webs of the present invention comprising chemical functional agents such as wet strength or dry strength binders, retention aids, surfactants, sizing agents, chemical softeners, fillers, flocculents and other crepe-facilitating components. Further, other material can be present in the creped tissue paper web so long as it does not interfere or counteract the advantages of the present invention.

The polyamine-epihalohydrin resin present in the creped tissue paper web is from about 0.0001% to about 5%, preferably from about 0.0005% to about 1%, and most preferably from about 0.001% to about 0.5% by weight based on paper.

The PVOH present in the creped tissue paper web is from about 0.0001% to about 5%, preferably from about 0.0005% to about 1%, and most preferably from about 0.001% to about 0.5% by weight based on paper.

The application of creping adhesives of the present invention can be done in any manner known in the art and in forms comprising aqueous, solid, dispersion or aerosol. One preferred mode of application is via a spray boom directed at the surface of the drying surface prior to transfer of the paper web. The creping adhesives can also be added at the wet end of the paper machine or can be applied to the wet web prior to its contact with the surface. Spray application of the creping adhesive can be done according to any of the conventional methods known in the art or any desired combination of application procedures. The order of addition of the creping adhesive comprising polyamine-epihalohydrin resin and PVOH can be varied. The methods of application comprise simultaneous or individual application of the polyamine-epihalohydrin resin and PVOH to a drying surface or web to form the creping adhesive.

As used herein, the term "solids" refers to the materials that are the active components or active ingredients of the present invention. The creping adhesives of the present invention are present in an aqueous solution with a solids content of polyamine-epihalohydrin resin and PVOH.

The concentration of solids in the aqueous solution is from about 0.01% to about 10.0% solids, preferably from about 0.2% to about 5.0% by weight total polymer solids, and most preferably from about 0.1% to about 2.5% by weight of total polymer solids.

The fraction of polyamine-epihalohydrin present in the solids is from about 5.0% to about 95.0%, preferably from about 7.5% to about 92.5%, and most preferably from about 10% to about 90% by weight.

The fraction of PVOH present in the solids is from about 95% to about 5.0%, preferably from about 92.5% to about 7.5%, and most preferably from about 90.0% to about 10.0% by weight.

PVOH of the present invention can include any PVOH known in the art and able to form an adhesive film. The PVOH that can be used in the present invention include the Airvol PVOH products, available from Air Products and Chemicals Inc., Allentown Pa. and the Elvanol PVOH products available from the DuPont Co., Wilmington Del.

The PVOH of the present invention can have a molecular weight range from about 10,000 to about 1,000,000 Daltons, preferably from about 20,000 to about 500,000 Daltons, and most preferably from about 50,000 to about 250,000 Daltons.

The PVOH of the present invention can have a degree of hydrolysis range from about 80% to about 99%, preferably from about 85% to about 99%, and most preferably from about 87% to about 98%.

The synthesis and use of cationic, water-soluble polyamine-epihalohydrin resins for papermaking are well known in the art. The polyamine-epihalohydrin resins are disclosed in detail in U.S. Pat. No. 3,248,353 and U.S. Pat. No. 3,567,659, which are incorporated by reference herein. The polyamine-epihalohydrin resins of the present invention are derived from the reaction of polyamine and epihalohydrin.

The polyamine of the present invention can include polyalkylene, polyaralkylene, polyalkarylene or polyarylene polyamines. Polyaralkylene polyamines include 1-phenyl-2,4-pentanediamine or 2-phenyl-1,3-propanediamine. Polyarylene polyamines include phenylene diamine.

Preferably, the creping adhesives of the present invention comprise polyalkylene polyamines. The polyalkylene polyamines of the present invention include ethylenediamine, bishexamethylenediamine, hexamethylenediamine, diethylenetriamine (DETA), triethylenetetramine (TETA), tetraethylenepentamine (TPPA), dipropylenetriamine (DPTA), tripropylenetetramine (TPTA), tetrapropylenepentamine (TPPA), N-methyl-bis-(aminopropyl)amine (MBAPA), spermine, or spermidine. The polyalkylene polyamine-epihalohydrin resins are described in patents such as U.S. Pat. No. 3,655,506, U.S. Pat. No. 3,248,353 and U.S. Pat. No. 2,595,935. The disclosures of these patents are incorporated by reference herein in their entireties.

The polyalkylene polyamines used in the present invention are preferably selected from the group consisting of polyalkylene polyamines of the formula:

$H_2N$—A—H, wherein A is $[CHZ—(CH_2)_n—NR—]_x$, or $[CH_2—(CHZ)_m—(CH_2)_n—NR—]_x$, when A is $[CHZ—(CH_2)_n—NR—]_x$, n=1 to 7; x=1 to 6; R=H or $CH_2Y$; Z=H or $CH_3$; and Y=$CH_2Z$, H, $NH_2$, or $CH_3$, when A is $[CH_2—CHZ)_m—(CH_2)_n—NR—]_x$, m=1 to 6, n=1 to 6, m+n=2 to 7, R=H or $CH_2Y$, Z=H or $CH_3$, and Y=$CH_2Z$, H, $NH_2$, or $CH_3$, and mixtures thereof.

The preferred polyalkylene polyamines include bishexamethylenetriamine, hexamethylenediamine, and mixtures thereof.

The epihalohydrin of the present invention can include epichlorohydrin, epibromohydrin or epiiodohydrin. The preferred epihalohydrin includes epichlorohydrin.

The polyamine-epihalohydrin resins of the present invention comprise the water-soluble polymeric reaction product of epihalohydrin and polyamine. In making Daniel=s Resins, the polyamine is added to an aqueous mixture of the epihalohydrin so that during addition, the temperature range is less than or equal to 60° C. Preferably, the temperature range is from about 25° C. to about 60° C. Most preferably, the temperature range is from about 30° C. to about 45° C. Lower temperatures lead to further improvements, however, too low a temperature can build dangerously latent reactivity into the system.

Alkylation of the polyamine occurs rapidly to form secondary and tertiary amines depending on the relative amounts of epihalohydrin and polyamine. The levels of epihalohydrin and polyamine are such that between about 50% and 100% of the available amine nitrogen sites are alkylated to tertiary amines. Excess epihalohydrin beyond that required to fully alkylate all the amine sites to the tertiary amine is less preferred because this results in increased production of epihalohydrin byproducts.

Following complete addition of the polyamine, the temperature of the mixture is allowed to rise and/or the mixture is heated to effect crosslinking and azetidinium formation. The crosslinking rate is a function of concentration, temperature, agitation, and the addition conditions of the polyamine, all of which can be readily determined by those skilled in the art. The crosslinking rate can be accelerated by the addition of small shots of the polyamine or other polyamines of the present invention or addition of various alkalines at or near the crosslinking temperature. The resin can be stabilized against further crosslinking to gelation by addition of acid, dilution by water, or a combination of both. Acidification to pH 5.0 or less is generally adequate.

The polyamine-epihalohydrin resin has a molecular weight range from about 500 to about 1,000,000 Daltons, preferably from about 2,500 to about 500,000 Daltons, and most preferably from about 5,000 to about 250,000 Daltons.

The polyamine-epihalohydrin resin of the present invention includes thermosetting or non-thermosetting resins.

The ratio by weight of polyamine-epihalohydrin resin to PVOH is a range from about 99:1 to 1:99, preferably from about 95:5 to 5:99, and most preferably from about 90:10 to 10:90.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever.

EXAMPLES

Example 1
Preparation of Polyamine-Epihalohydrin Resins

The polyamine-epihalohydrin resins of the present invention are prepared according to methods known in the art. The resins are prepared in a one step process in which a polyamine and an epichlorohydrin are reacted in an aqueous medium until the desired molecular weight is achieved. The reaction is then diluted and/or stabilized at an acidic pH with an added acid.

To a flask are added 92.53 g (1.00 mole) of epichlorohydrin with an approximately equal mass of water, and the temperature is adjusted to approximately 24EC. To this mixture, 0.433 moles of polyalkylene polyamine is added over a period of 30 minutes while maintaining the temperature of the reaction mixture below approximately 40EC. Water is then added to dilute the reaction in order to bring the level of total solids to approximately 54%, and the reaction mixture is allowed to rise to a temperature of approximately 50EC using the exotherm of the reaction. The mixture is then heated to approximately 85EC until a Gardner-Holt viscosity of "S" to "T" is achieved. At this point, water is added to bring the solids level to about 46% and the temperature is adjusted to approximately 76EC. The temperature is maintained at this point until a Gardner-Holt viscosity of "T" to "U" is achieved. Heating is discontinued and concentrated sulfuric acid and water are added to the reaction to bring the solids level to about 38%. After cooling to below approximately 35EC, the pH is then adjusted to about 2.75 with concentrated sulfuric acid.

Other polyamine-epihalohydrin resins of the present invention may be prepared as described above.

Example 2

Figure 1:
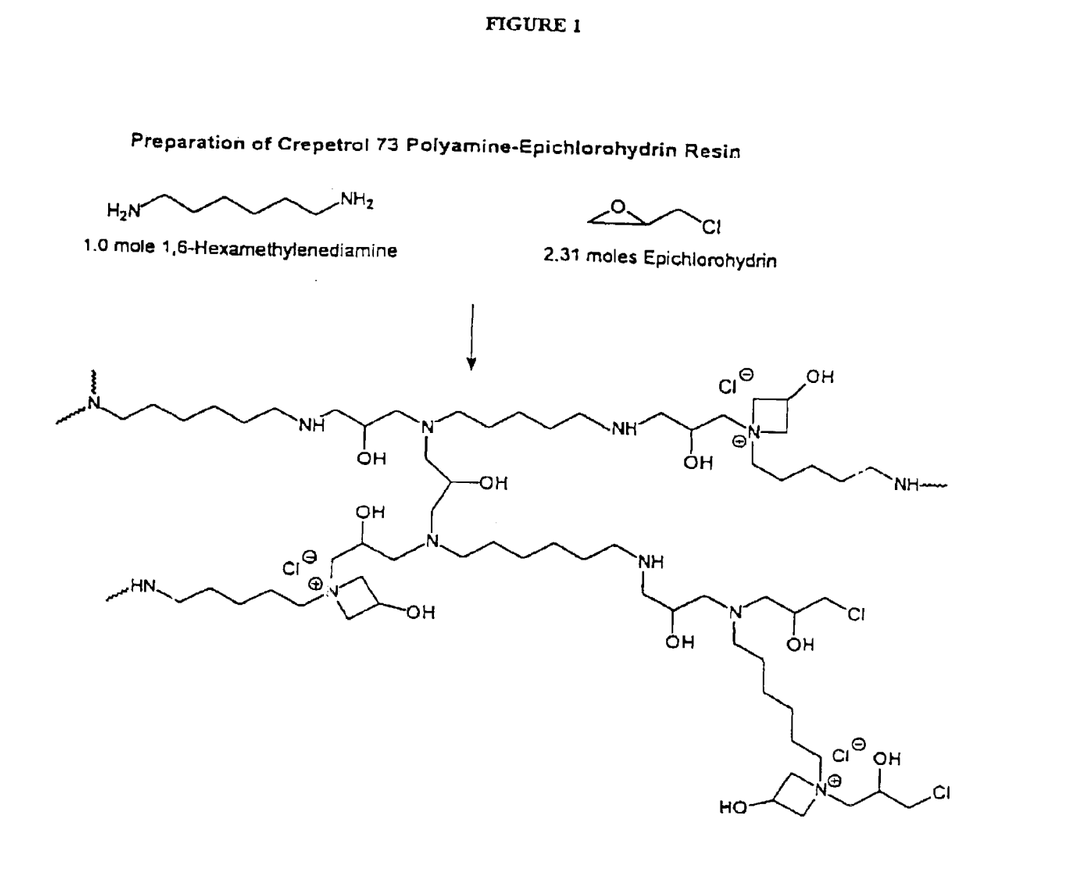
FIG. 1 illustrates a schematic representation of the preparation and chemical structure of Crepetrol 73 polyamine-epichlorohydrin.

Polyamine-epihalohydrin resin of this example is prepared as described in Example 1. The polyamine-epihalohydrin resin is prepared from 1 mole of 1,6-hexamethylenediamine and 2.31 moles of epicholorohydrin. The resulting hexamethylenediamine-epichlorohydrin resin is a highly branched, irregular structure that contains a number of different functional groups. These include secondary alcohol, secondary amine, tertiary amine, azetidinium chloride and aminochlorohydrin. The resulting polyamine-epihalohydrin resin is shown in FIG. 1 having a highly branched structure.

Example 3

Figure 2:
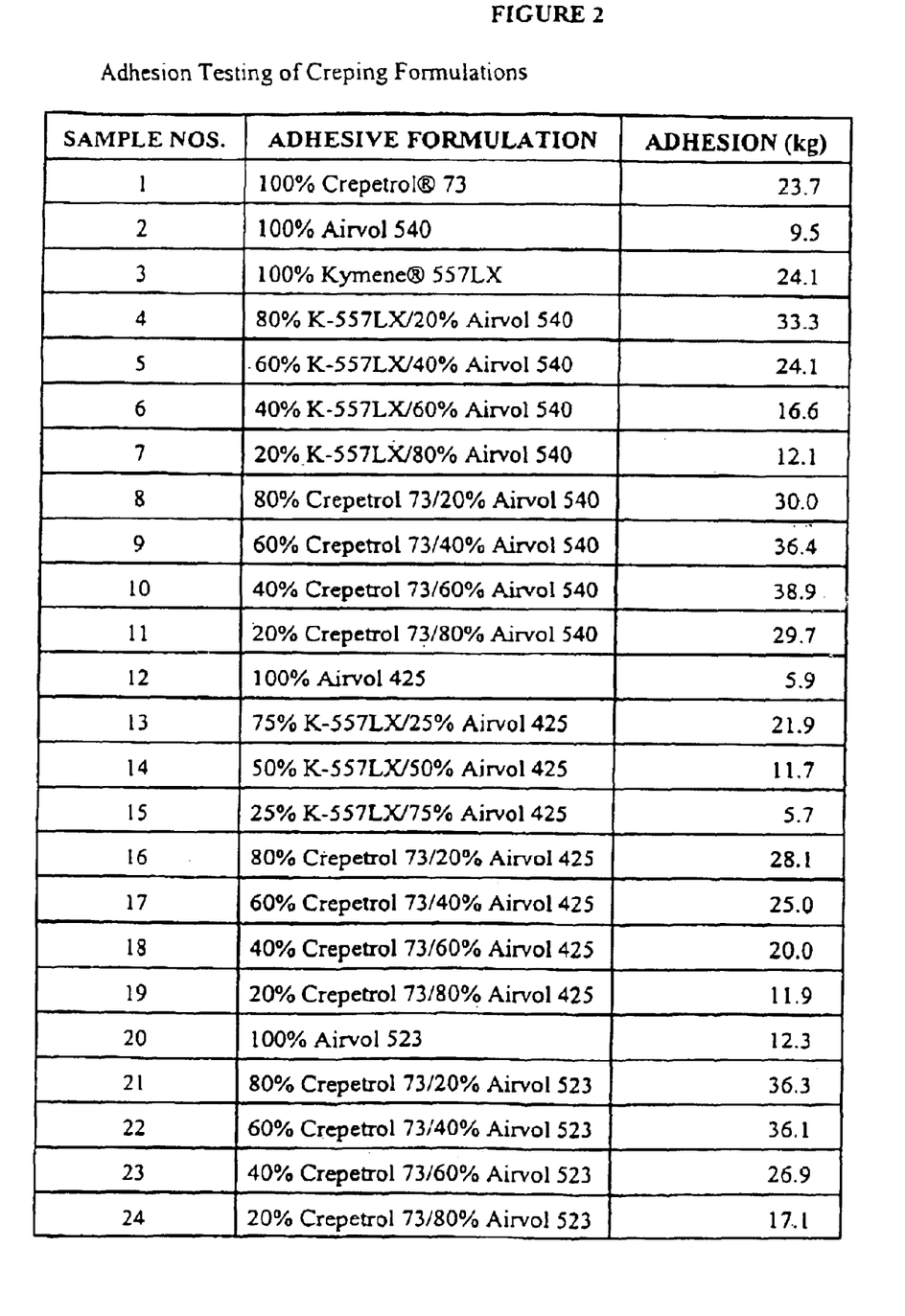
FIG. 2 is a table demonstrating the creping adhesion for combinations of Crepetrol 73-PVOH (Crepetrol 73 available from Hercules Inc., Wilmington, Del.) and Kymene 557LX-PVOH (Kymene 557LX available from Hercules Inc., Wilmington, Del.).

A series of samples (Sample Nos. 8–11, 16–19 and 21–24) containing various PVOH, polyamine-epihalohydrin resins, and mixtures thereof are shown in FIG. 2. In FIG. 2, Airvol 523, Airvol 540 and Airvol 425 manufactured by Air Products and Chemicals, Inc. (Allentown, Pa.) and are various grades of PVOH used in this example. Airvol 523 and Airvol 540 are partially hydrolyzed PVOH products (degree of hydrolysis=87.0–89.0%). The weight average molecular weight of Airvol 523 is in the range of 85,000–146,000 Daltons while the weight average molecular weight of Airvol 540 is between 124,000 and 186,000 Daltons. Airvol 425 is a PVOH product having an intermediate level of hydrolysis (95.5–96.5%) and a weight average molecular weight in the range of 85,000 to 150,000 Daltons. Crepetrol 73 which is manufactured by Hercules Inc. (Wilmington, Del.) is a polyamine-epichlorohydrin resin used in this example. The thermosetting, cationic polyamidoamine-epichlorohydrin resin in this example is Kymene 557LX also manufactured by Hercules Inc.

A series of samples of FIG. 2 (Sample Nos. 8–11, 16–19 and 21–24) containing polyamine-epihalohydrin resins and PVOH, of the present invention, are prepared as described in Example 1.

In addition, comparative samples (Sample Nos. 4–7 and 13–15) containing polyamidoamine-epihalohydrin resins and PVOH are prepared in a two-step process. The first step is the polycondensation of a dicarboxylic acid and a polyamine to form a polyamidoamine prepolymer. The prepolymer is then reacted with an epihalohydrin in aqueous solution with heating. When the desired molecular weight or level of viscosity is achieved, the reaction is diluted and/or stabilized with the addition of acid.

Adhesion testing is performed on the polyamine-epihalohydrin samples of the present invention (Sample Nos. 8–11, 16–19 and 21–24) and comparative samples (Sample Nos. 4–7 and 13–15). The adhesion testing is performed as described below.

A device for evaluating the adhesive properties of potential creping adhesives is constructed. This apparatus consists of a heated cast iron block that is mounted on the actuator of a MTS test instrument. This plate is heated to approximately 120EC. A paper sample is attached to the upper platen of the load cell of the test instrument with double sided tape with a 0.057–0.058 inch Flex Cushion (Nensco; Milbury, Mass.) which is adhered between the paper sample and the load cell. To perform the test, a known quantity of an aqueous solution of creping adhesive with a known concentration is sprayed onto the heated block. This application is accomplished using an airbrush fitted with a volumetric spray bottle. The volumetric spray bottle allows accurate measurement of the amount of solution applied to the test platen. For the present invention, 2.4 ml of a 2% solids aqueous solution is sufficient for the test conditions. After the resin is sprayed onto the heated block, the actuator is raised to contact the heated block to the paper sample with a force of 10 kg. The actuator is then lowered and the force to pull the platen away from the paper sample is measured. This force is the adhesion value of the particular resin that is being tested. Since the applied force is not always 10 kg, the adhesion value is normalized to account for slight variations in the applied force. This normalization is accomplished by multiplying the adhesion value by [10/(Applied force in kg)]. The paper which is used for testing is a 40 lb basis weight sheet that is prepared from a 70/30 hardwood/softwood bleached Kraft furnish.

The results of the adhesive testing are illustrated in FIG. 2.

FIG. 2 shows a comparison of the adhesion capability of creping adhesives of the present invention containing polyamine-epihalohydrin, and comparable samples containing polyamidoamine-epihalohydrin. Various grades of PVOH are combined with the samples of the presentation invention and comparative samples. Sample nos. 8–11 of the present invention in combination with Airvol 540, demonstrate a higher level of adhesion than the comparative sample nos. 4–7. Similarly, sample nos. 16–19 of the present invention which are combined with Airvol 425, show a higher level of adhesion than the comparative sample nos. 13–15. Further, sample nos. 21–24 of the present invention in combination with Airvol 523, show a similar level of adhesion as sample nos. 8–11 which are combined with Airvol 540.

The results from FIG. 2 show creping adhesives of the present invention demonstrate stronger adhesion in comparison to comparable creping adhesives.

Figure 3:
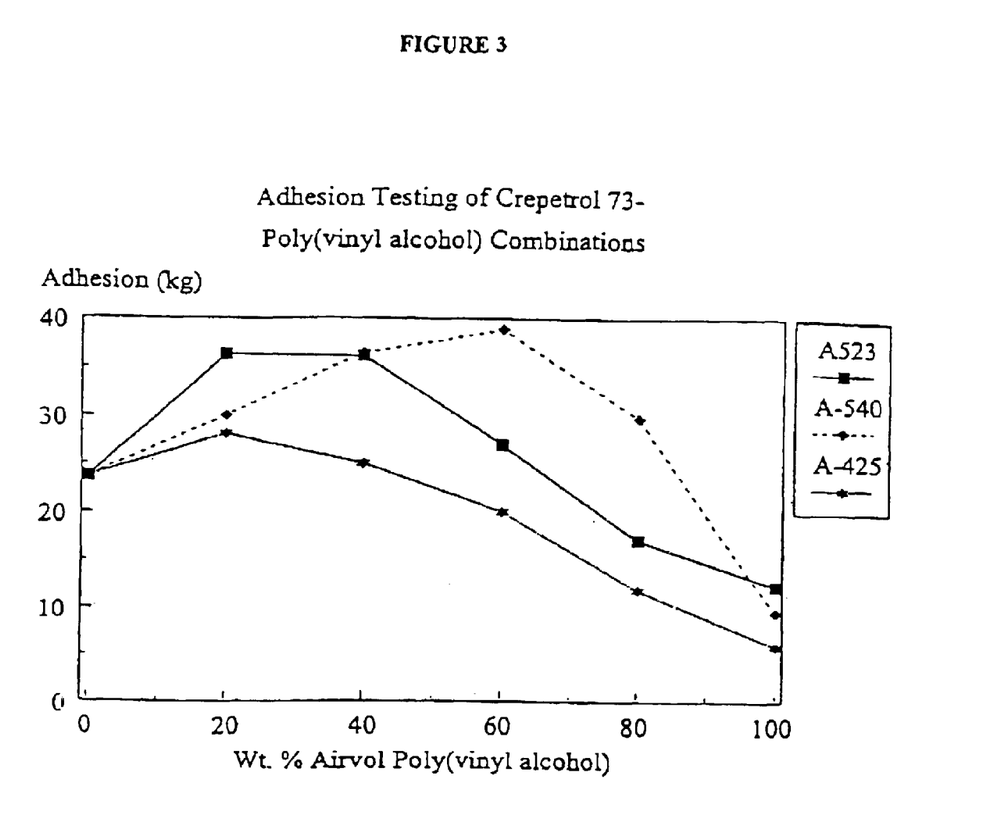
FIG. 3 depicts the relationship between the blends of polyamine-epichlorohydrin resin in concentrations from 20% to 100%, and various grades of PVOH in concentrations from 80% to 0%, and creping adhesion.

Adhesion testing of the Crepetrol 73-PVOH formulations is further depicted in FIG. 3. The samples of Crepetrol 73-PVOH are prepared as described in Example 1, and the testing for creping adhesion is performed as described above. Varying concentrations of PVOH are shown from 0 to 100%. The concentration of Crepetrol 73 also varies according to the amount of PVOH present, so that the combination of both in the mixture equals to 100%. The level of adhesion for creping adhesive combinations of Crepetrol 73-Airvol 523, Crepetrol 73-Airvol 540 and Crepetrol 73-Airvol 425 demonstrate high levels of adhesion over a wide range of compositions.

Example 4

Production of Tissue Paper

A 0.5% solids aqueous solution of creping adhesive is sprayed onto the surface of a Yankee Dryer along with the appropriate amount of release agent to provide a good balance of adhesion and release. This application optimizes both the productivity of the paper machine and the quality of the product produced on the machine. The solids consist of about 60% Airvol 540 (PVOH) and 40% Crepetrol 73 (polyamine-epihalohydrin resin). A cellulosic fibrous web is pressed against the drying surface to adhere the web to the surface. The dry web is then dislodged from the drying surface with a doctor blade and is wound on a reel. After the tissue material is converted to the final product (e.g., facial tissue, bath tissue, kitchen towel, etc.), it is then subjected to a sensory panel to obtain a softness rating.

Although the invention has been described with reference to particular means, materials and embodiments, it is to be understood that the invention is not limited to the particulars disclosed, and extends to all equivalents within the scope of the claims.

The preceeding examples can be repeated with similar success by substituting the generically and specifically described constituents and/or operating conditions of this invention for those used in the preceeding examples. From the foregoing descriptions, one skilled in the art can easily ascertain the essential characteristics of this invention, and without departing from the spirit and scope thereof, can make various changes and modifications of the invention to adapt to various usages and conditions.

What is claimed is:

1. A method of creping cellulosic fiber webs which comprises:
   a) applying a creping adhesive to a drying surface;
   b) adhering a cellulosic fiber web to said surface; and
   c) dislodging the web from said surface; wherein the creping adhesive comprises polyamine-epihalohydrin resin and poly(vinylalcohol).

2. The method of claim 1, wherein the creping adhesive comprises the reaction product of polyamine-epihalohydrin resin and poly(vinyl alcohol).

3. The method of claim 1, wherein the ratio by weight of polyamine-epihalohydrin resin:poly(vinyl alcohol) is a range from about 99:1 to 1:99.

4. The method of claim 3, wherein the ratio by weight of polyamine-epihalohydrin resin:poly(vinyl alcohol) is a range from about 95:5 to 5:95.

5. The method of claim 4, wherein the ratio by weight of polyamine-epihalohydrin resin:poly(vinyl alcohol) is a range from about 90:10 to 10:90.

6. The method of claim 1, wherein the polyamine-epihalohydrin resin is from about 0.0001% to about 5% by weight based on paper.

7. The method of claim 6, wherein the polyamine-epihalohydrin resins is from about 0.0005% to about 1% by weight based on paper.

8. The method of claim 7, wherein the polyamine-epihalohydrin resin is from about 0.001% to about 0.5% by weight based on paper.

9. The method of claim 1, wherein the poly(vinyl alcohol) is from about 0.0001% to about 5% by weight based on paper.

10. The method of claim 9, wherein the poly(vinyl alcohol) is from about 0.0005% to about 1% by weight based an paper.

11. The method of claim 10, wherein the poly(vinyl alcohol) is from about 0.001% to about 0.5% by weight based on paper.

12. The method of claim 1, wherein the creping adhesive is in an aqueous solution.

13. The method of claim 12, wherein the concentration of creping adhesive in the aqueous solution is from about 0.01% to about 10% solids by weight.

14. The method claim 12, wherein the concentration of creping adhesive in an aqueous solution is from about 0.2% to about 5% solids by weight.

15. The method of claim 12, wherein the concentration of creping adhesive in an aqueous solution is from about 0.1% to about 2.5% solids by weight.

16. The method of claim 12, wherein the solids comprises a fraction of polyamine-epihalohydrin resin from about 7.5% to about 92.5% by weight.

17. The method of claim 16, wherein the solids comprises a fraction of polyamine-epihalohydrin resin from about 7.5% to about 92.5% by weight.

18. The method of claim 17, wherein the solids comprises a fraction of polyamine-epihalohydrin resin from about 10% to about 90% by weight.

19. The method of claim 12, wherein the solids comprises a fraction of poly(vinyl alcohol) from about 95% to about 5% by weight.

20. The method of claim 19, wherein the solids comprises a fraction of poly(vinyl alcohol) from about 92.5% to about 7.5% by weight.

21. The method of claim 20, wherein the solids comprises a fraction of poly(vinyl alcohol) from about 90% to about 10% by weight.

22. The method of claim 1 wherein the polyvinyl alcohol has a degree of hydrolysis range from about 80 to about 99 mol percent.

23. The method of claim 22 wherein the polyvinyl alcohol has a degree of hydrolysis range from about 85 to about 99 mol percent.

24. The method of claim 23 wherein the polyvinyl alcohol has a degree of hydrolysis range from about 87 to about 98 mol percent.

25. The method of claim 1, wherein the applying step comprises simultaneously applying a polyamine-epihalohydrin resin and a poly(vinyl alcohol) to the drying surface.

26. The method of claim 1, wherein the applying step comprises individually applying a polyamine-epihalohydrin resin and a poly(vinyl alcohol) to the drying surface.

27. The method of claim 1, wherein the polyamine-epihalohydrin resin is the reaction product of an epihalohydrin and a polyamine, the polyamine having the following formula:

wherein A is $[CHZ-(CH_2)_n-NR-]_x$, or $[CH_2-CHZ)_m-(CH_2-NR-]_x$, wherein A is $[CHZ-(CH_2)_n-NR-]_x$, n=1 to 7; x=1 to 6; R=H or $CH_2Y$; Y; Z=H or $CH_3$; and Y=$CH_2Z$, H, $NH_2$, or $CH_3$, and when A is $[CH_2-(CHZ)m-CH2)n-NR-]x$, m=1 to 6; n=1 to or $CH_2Y$, Z=H or $CH_3$; and Y=$CH_2Z$, H, $NH_2$, or $CH_3$.

28. The method of claim 27, wherein the reaction product of epihalohydrin and polyamine is formed at a temperature less than or equal to 60° C.

29. The method of claim 27, wherein the reaction product of epihalohydrin and polyamine is formed at a temperature from about 25° C. to about 60° C.

30. The method of claim 27, wherein the reaction product of epihalohydrin and polyamine is formed at a temperature from about 30° C. to about 45° C.

31. The method of claim 1, wherein the polyamine of the polyamine-epihalohydrin resin comprises polyalkyleneamine, polyaralkyleneamine, polyalkaryleneamine, or polyaryleneamine.

32. The method of claim 31, wherein the polyalkyleneamine comprises ethylenediamine (EDA), bishexamethylenediamine (BHMT), hexamethylenediamine (HMDA), diethylenetriamine (DETA), triethylenetetramine (TETA), tetraethylenepentamine (TEPA), dipropylenetriamine (DPTA), tripropylenetetramine (TPTA), tetrapropylenepentamine (TPPA), N-methyl-bis-(aminopropyl)amine (MBAPA), spermine or spermidine.

33. The method of claim 31, wherein the polyaralkyleneamine comprises 1-phenyl-2,4-pentane diamine, or 2-phenyl-1,3-propanediamine.

34. The method of claim 1, wherein the epihalohydrin of the polyamine-epihalohydrin resin comprises epichlorohydrin, epibromohydrin or epiiodohydrin.

35. The method of claim 1, wherein the epihalohydrin of the polyamine-epihalohydrin resin comprises epichlorohydrin, epibromohydrin, or epiiodohydrin.

36. The method of claim 1, wherein the drying surface comprises the drying surface of a Yankee Dryer.

37. The method of claim 36, wherein the cellulosic fiber web is adhered to the drying surface.

38. The method of claim 37, wherein the dry cellulosic fiber web is creped from the drying surface.

39. The method of claim 38, wherein the creping adhesive is in a form comprising aqueous, solid, dispersion or aerosol.

40. The method of claim 1, wherein the creping adhesive is in a form comprising aqueous, solid, dispersion, or aerosol.

* * * * *